United States Patent
Neugebauer et al.

(10) Patent No.: US 11,727,022 B2
(45) Date of Patent: Aug. 15, 2023

(54) GENERATING A GLOBAL DELTA IN DISTRIBUTED DATABASES

(71) Applicant: International Business Machines Corporation, Armonk, NY (US)

(72) Inventors: Robert Neugebauer, Stouffville (CA); Ian Richard Finlay, Uxbridge (CA); Glenn Patrick Steffler, Markham (CA); Mohammad Wasif Khan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 17/206,876

(22) Filed: Mar. 19, 2021

(65) Prior Publication Data

US 2022/0300504 A1 Sep. 22, 2022

(51) Int. Cl.
| | |
|---|---|
| *G06F 16/2458* | (2019.01) |
| *G06F 16/242* | (2019.01) |
| *G06F 16/2457* | (2019.01) |
| *G06F 16/2453* | (2019.01) |
| *G06F 16/23* | (2019.01) |
| *G06F 16/22* | (2019.01) |

(52) U.S. Cl.
CPC ...... *G06F 16/2471* (2019.01); *G06F 16/2282* (2019.01); *G06F 16/2358* (2019.01); *G06F 16/2433* (2019.01); *G06F 16/24534* (2019.01); *G06F 16/24573* (2019.01)

(58) Field of Classification Search
CPC ............. G06F 16/2471; G06F 16/2282; G06F 16/2433; G06F 16/24534; G06F 16/24573; G06F 16/2358
See application file for complete search history.

(56) References Cited

U.S. PATENT DOCUMENTS

| | | | |
|---|---|---|---|
| 5,634,053 A | 5/1997 | Noble et al. | |
| 6,401,104 B1 | 6/2002 | LaRue et al. | |
| 7,107,297 B2 | 9/2006 | Yellepeddy et al. | |
| 8,086,569 B2 | 12/2011 | Jasrasaria | |
| 8,538,985 B2 | 9/2013 | Betawadkar-Norwood et al. | |

(Continued)

FOREIGN PATENT DOCUMENTS

| | | |
|---|---|---|
| CN | 102693324 B | 3/2015 |
| WO | 2019194742 A1 | 10/2019 |

OTHER PUBLICATIONS

Bent et al., "A Dynamic Distributed Federated Database", Conference Paper, Sep. 2008, 9 pages.

(Continued)

*Primary Examiner* — Vaishali Shah
*Assistant Examiner* — Lana Alagic
(74) *Attorney, Agent, or Firm* — Donald J. O'Brien

(57) ABSTRACT

Embodiments are disclosed for a method. The method includes receiving a plurality of local deltas for a query execution against a corresponding plurality of data sources hosted by a corresponding plurality of distributed nodes of a dynamic distributed network. The method also includes generating a combined delta by combining the local deltas. Additionally, the method includes generating a determined delta result by performing additional processing on the combined delta. Further, the method includes providing the determined delta for one of the distributed nodes.

20 Claims, 8 Drawing Sheets

(56) References Cited

U.S. PATENT DOCUMENTS

| | | | |
|---|---|---|---|
| 9,471,647 | B2 | 10/2016 | Bent et al. |
| 10,290,027 | B2 | 5/2019 | Bharath |
| 10,776,355 | B1* | 9/2020 | Batsakis ............. G06F 16/2471 |
| 11,308,106 | B1* | 4/2022 | Muralimanohar ...... G06F 16/27 |
| 2002/0083265 | A1* | 6/2002 | Brough ............... G06F 16/9574 |
| | | | 711/171 |
| 2004/0030703 | A1* | 2/2004 | Bourbonnais ....... G06F 16/2379 |
| 2004/0133538 | A1 | 7/2004 | Amiri et al. |
| 2004/0199552 | A1* | 10/2004 | Ward ...................... G06F 16/27 |
| 2006/0285506 | A1 | 12/2006 | Kashyap |
| 2009/0077036 | A1 | 3/2009 | Bent et al. |
| 2011/0072006 | A1* | 3/2011 | Yu ..................... G06F 16/24535 |
| | | | 707/718 |
| 2012/0331010 | A1* | 12/2012 | Christie .................. G06F 16/25 |
| | | | 707/802 |
| 2013/0310750 | A1 | 11/2013 | Hopman |
| 2014/0310232 | A1 | 10/2014 | Plattner et al. |
| 2015/0026429 | A1 | 1/2015 | Bobroff |
| 2015/0046267 | A1 | 2/2015 | Mactiernan |
| 2018/0035938 | A1 | 2/2018 | El Kaliouby |
| 2019/0121809 | A1 | 4/2019 | Murthy et al. |
| 2020/0142980 | A1* | 5/2020 | Cseri .................. G06F 16/2455 |
| 2020/0151178 | A1 | 5/2020 | Ramesh |
| 2020/0409939 | A1* | 12/2020 | Flanagan ............ G06F 16/2282 |

OTHER PUBLICATIONS

Vyvyan et al., "gaiandb / gaiandb", printed Feb. 3, 2021, 81 pages.

Ram et al., "Extracting delta for incremental data warehouse maintenance", Aug. 6, 2002, 10 pages.

Unknown, "How Delta Propagation Works", Jun. 11, 2020, 3 pages.

Olston et al., "Best-effort cache synchronization with source cooperation", SIGMOD '02 Proceedings of the 2002 ACM SIGMOD international conference on Management of data, Jun. 2002, 12 pages.

Kumar et al., "Cache Based Query Optimization Approach in Distributed Database", IJCSI International Journal of Computer Science Issues, vol. 9, Issue 6, No. 1, Nov. 2012, 7 pages.

Zanfaly et al., "Multilevel caching to speedup query processing in distributed databases", Dec. 17, 2003, pp. 580-583.

Ahmad et al., "DBToaster: Higher-order Delta Processing for Dynamic, Frequently Fresh Views", Proceedings of the VLDB Endowment Hompage archive, vol. 5, Issue 10, Jun. 2012, pp. 968-979.

Mell et al., "The NIST Definition of Cloud Computing", Recommendations of the National Institute of Standards and Technology, Sep. 2011, 7 pages.

Neugebauer et al., "Querying Distributed Databases", U.S. Appl. No. 17/206,807, filed Mar. 19, 2021.

IBM, List of IBM Patents or Patent Applications Treated as Related, Mar. 19, 2021, 2 pages.

U.S. Appl. No. 17/206,807—List of References, mailed Jan. 19, 2023.

* cited by examiner

US 11,727,022 B2

GENERATING A GLOBAL DELTA IN DISTRIBUTED DATABASES

BACKGROUND

The present disclosure relates to distributed databases, and more specifically, to generating a global delta in distributed databases.

A distributed and dynamic computing system (DDCS) refers to a computing environment having a relatively large number of geographically dispersed and inter-connected computing nodes. The nodes can establish connections with other nodes in a dynamic manner (and, without a predetermined topology). In this regard, a DDCS can also be characterized as ad-hoc. Examples of topologies that may be used within a DDCS include fully connected, hierarchical, ring, and non-uniform partially connected graphs. Further, a given DDCS may be subdivided into portions, where each different portion is implemented using one of the example topologies. Thus, when taken as a whole, the DDCS includes multiple and different topologies.

One example of a DDCS is a distributed database. A distributed database can be configured for relatively efficient, query-response operations, such as, structured query language (SQL) queries.

SUMMARY

Embodiments are disclosed for a method. The method includes receiving a plurality of local deltas for a query execution against a corresponding plurality of data sources hosted by a corresponding plurality of distributed nodes of a dynamic distributed network. The method also includes generating a combined delta by combining the local deltas. Additionally, the method includes generating a determined delta result by performing additional processing on the combined delta. Further, the method includes providing the determined delta for one of the distributed nodes.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
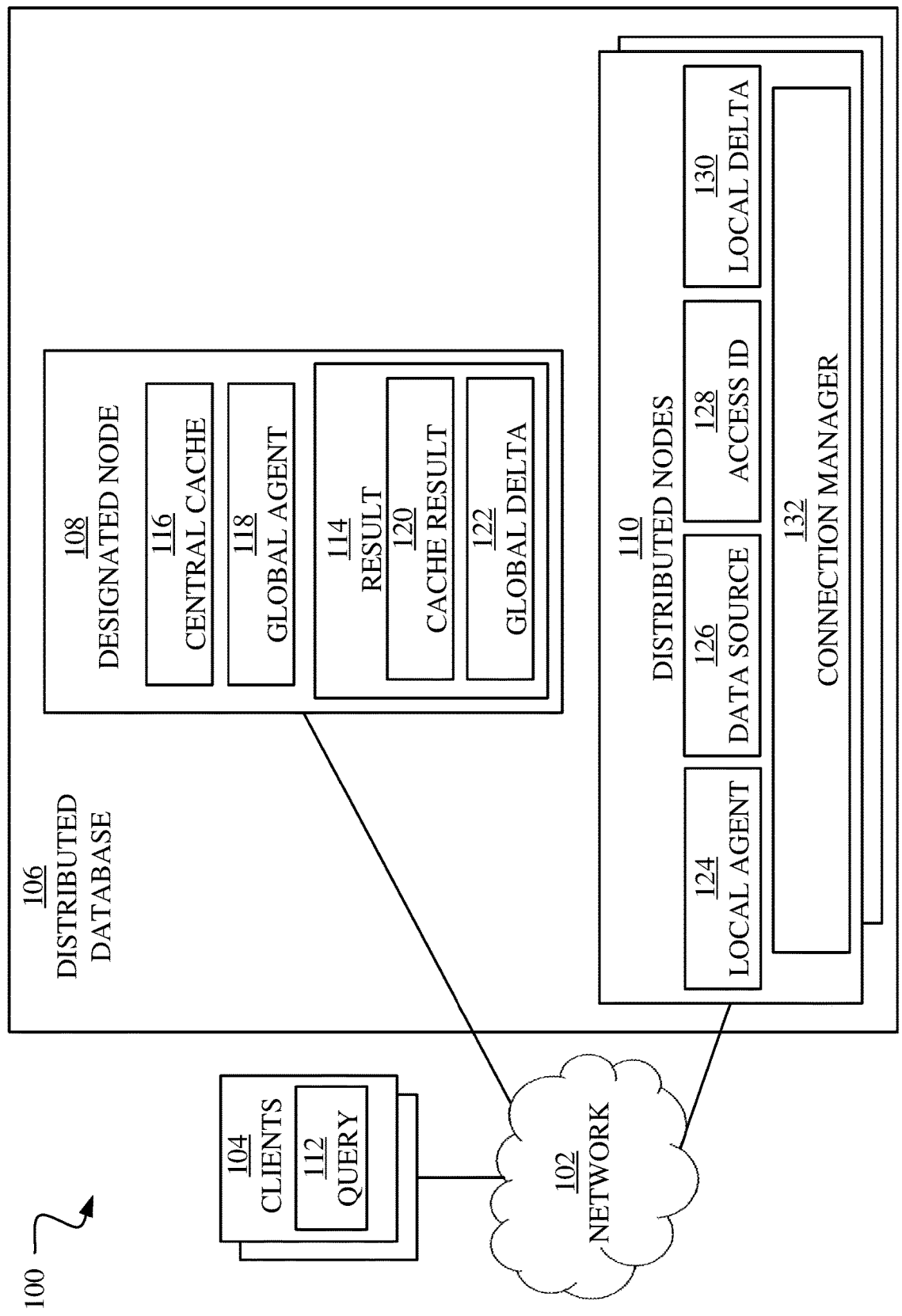
FIG. 1 is a block diagram of an example system for querying a distributed database using global deltas, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, distributed databases are a type of DDCS that can be useful for query-response type operations. Another example of a DDCS is a federated database. A federated database is made up of a number of interconnected database management systems (DBMSs), each of which manages one or more databases. The federated database allows a single query to access the databases through the interconnected DBMSs. The query is received by the federated database and propagated over connections between the various DBMSs. The DBMSs of databases targeted by the query can translate the query into actions that are compatible with the target databases.

Computer databases are structured collections of data which are managed to meet the needs of a community of users. A computer database relies on software, e.g., a DBMS, to manage the access and organization of the data. However, an organization may depend on a variety of computer databases that are not natively compatible. For example, the various computer databases within an organization may use different operating systems, query languages, protocols, data structures or provide different functional capabilities. Accordingly, the organization can use a federated database to unify the various computer databases. More specifically, a federated database can take a single query and access multiple (and different) DBMSs. The DBMSs are interconnected to allow messages to be passed through the federated database. They also act as interpreters which translate the various queries into actions that are compatible with the databases they control. In this way, the DBMSs can act as gateways for accessing their respective databases.

The number of potential devices incorporated into databases continues to expand, creating computing architectures with different types of network connections. For example, some of the interconnected nodes may maintain relatively stable network connections, where the devices connect, disconnect, and reconnect on the same computer communication networks. In contrast, other nodes can be interconnected in a dynamic manner, wherein these nodes connect, disconnect, and reconnect on the same or different computer communication networks.

In such a dynamic network of interconnected nodes, each of which contains data and encompasses some computational capability, a global delta may be useful. The global delta can represent a global set of changes that have occurred over a number of data sources of the distributed database. Accordingly, the global delta can be useful for purposes such as, data cache maintenance, data flow optimization, querying for changes in the data, statistical information updates, and the like. In scenarios where a given relation of data exists on one data source in the distributed database, existing methods for computing the delta of a single data source system can provide a small subset of a global delta. Further, computing a more general delta may be possible by having a central node maintain a copy of the distributed database in a prior state, and retrieve data for the current state from the distributed nodes. However, such techniques can involve such a large data transfer that by the time the global delta is computed, the global delta may be out of date, or not worth computing.

Accordingly, some embodiments of the present disclosure can enable nodes within a dynamic network of arbitrary depth to collaborate with other distributed nodes to compute a global delta over multiple data sources by determining changes that have occurred between a prior state and the current state. Advantageously, such embodiments can compute the global delta without reading or transmitting the full data set across the network. In this way, such embodiments can improve computing technology with respect to the efficiency of distributed database operations by providing a global delta across a distributed network of data sources.

FIG. 1 is a block diagram of an example system 100 for querying a distributed database using global deltas, in accordance with some embodiments of the present disclosure. The system 100 includes a network 102, clients 104, and a distributed database 106 (which can include a designated node 108 and distributed nodes 110). The network 102 may be a local area network, wide area network, or collection of computer communication networks that facilitates communication between components of the system 100, specifically, between the clients 104 and the distributed database 106 (through potentially separate connections to the designated node 108 and distributed nodes 110). In some embodiments, the network 102 can be the Internet.

The clients 104 can represent computing devices capable of generating a query 112 to process against a database, such as, the distributed database 106. More specifically, the clients 104 can host computer applications that generate structured query language (SQL) queries to execute against sources of data in the distributed database 106. Further, the clients 104 can provide the query 112, for the designated node 108, which can provide a result 114 for the client 104 based on the query 112. The result 114 can include the output from executing the query 112 against the distributed database 106. For example, the result 114 can include a listing of data values retrieved from the distributed database 106 based on the specific operations of the query 112.

The distributed database 106 can be a collection of data sources in a computing environment having a relatively large number of geographically dispersed and inter-connected computing nodes. More specifically, the distributed database 106 includes the designated node 108 and distributed nodes 110.

The designated node 108 can be a computing device in the distributed database 106 that processes the query 112 from the clients 104 and provides the result 114. In some embodiments of the present disclosure, the distributed database 106 can include multiple designated nodes. The designated node 108 includes the result 114, a central cache 116, and global agent 118. The central cache 116 can be a database or other datastore that includes selected results from prior queries executed against the distributed database 106. The global agent 118 can select the results stored in the central cache 116 based on the frequency of access. The size of the central cache 116 can be limited. As such, the global agent 118 can limit the results stored in the central cache 116 to results with higher access frequency.

Additionally, upon receiving the query 112 from the client 104, the global agent 118 can decompose the query 112 into component queries based on the sources of the data, and the relationships in those sources. In this context, the source of the data can refer to one or more tables in a database. The component queries may use a variety of data access techniques, including direct table accesses, entire sub queries that can be pushed to component data sources, and the like.

Further, the global agent 118 can match the component queries against the central cache 116 to identify the component queries that can be executed locally to the designated node 108. In this way, the global agent 118 can create a cache result 120 as a component of the result 114. Additionally, the global agent 118 can identify component queries to execute against remote data sources on the distributed nodes 110. Thus, for the component queries that do not match the locally cached data of the central cache 116, the global agent 118 can provide these component queries for the distributed nodes 110. In this way, the global agent 118 can create a global delta 122 as a component of the result 114. The global delta 122 can represent the collective results from the distributed nodes 110.

For each distributed node 110 receiving a component query, a local agent 124 can execute, or invoke, the component query against a local data source 126. The data source 126 can be one or more databases, files, or other datastores. Additionally, the local agent 124 can document identifying information about the data access in access identification (access id) 128. The access id 128 can include a log sequence number, commit identifier, timestamp, and/or any other information useful for identifying when the component query is run, and the specific data accessed. The local agent 124 can use the access id 128 to limit future access to data not previously accessed (as recorded in the access id 128). The access id 128 can be associated locally with the distributed node 110 in a form persistent across restart.

According to some embodiments of the present disclosure, the distributed nodes 110 can have some intrinsic capability of data processing, such as, a full query processing engine, data retrieval, and the like. Further, the distributed nodes 110 can have an intrinsic capability to compute a local delta 130. The local delta 130 can represent a delta between the data source 126 in a prior state and a current state. In some embodiments of the present disclosure, the local agent 124 can compute the local delta 130. Alternatively, for a distributed node that cannot compute the local delta 130, another distributed node connected to such node can generate the local delta 130 using existing techniques such as log analysis and extraction.

Further, the distributed nodes 110 can include a connection manager 132. Collectively, the connection managers 132 of the distributed nodes 110 can generate the global delta 122 by collaboratively generating and combing local deltas 130. Additionally, the connection managers 132 can provide communications functionality within the distributed database 106.

According to some embodiments of the present disclosure, each of one or more data sources 126 participating in a single query operation can build a local delta 130, and propagate the local delta 130 to peer nodes, e.g., distributed nodes 110, for use in further processing. More specifically, each data source 126 having previously been involved in the query operation can maintain information about prior query accesses in the access identification 128, which can enable the local agent 124 and/or connection manager 132 to build a set of changes for one or more data relations within the data source 126.

In some instances, the distributed node 110 may provide intrinsic capability for generating the local delta 130 from a specified prior state. In other instances, a distributed node connecting to the distributed node 110 hosting the data source 126 can generate the local delta 130. A distributed node 110 capable of generating the local delta 130 can use HISTORY tables that maintain the history of a table in a relational database system. In scenarios where a connected distributed node generates the local delta, the connection manager 132 can use log analysis to identify changes to one or more relations within the data source 126.

The connection manager 132 on each distributed node having thus generated the local delta 130 can initiate the transfer of the local delta 130 to other relevant distributed nodes 110 within the dynamic distributed network of the distributed database 106. In some scenarios, the local distributed node and the other relevant distributed nodes may not have direct connections. In such scenarios, the respective connection managers 132 can collaborate through tertiary distributed nodes that are not directly involved in the computation of the global delta 122.

Further, connection managers 132 of the distributed nodes 110, upon receipt of a local delta from another distributed node 110, can combine the received local delta with its own local delta 130 (if generated) for local processing. In some scenarios, each distributed node 110 may concurrently or separately receive multiple remote local deltas without coordination or synchronization upon the order of arrival. Once the local deltas are combined on the relevant nodes, the connection managers 132 can use the combined local deltas for purposes such as, data cache maintenance, data flow optimization, querying for changes in the data, statistical information updates, and the like.

A dynamic network of distributed nodes with access to a variety of data sources 126 provides the capability for user queries, e.g., query 112 to be executed, and read data from one or more of the data sources 126 that are available. When accessing these remote data sources, it can be useful to reduce the data transfer across the network of the distributed database 106. Accordingly, the connection manager 132 can reduce the amount of data transferred over the network by transferring the local deltas 130 instead of a complete query result. In some embodiments of the present disclosure, the local deltas 130 can be represented as sets of: newly added relations, removed relations, and changes to existing relations within the data sources 126.

In this way, the connection manager 132 provides advantages over existing techniques in that data transmission is comparatively reduced. Data transmission is thus reduced because the local deltas 130 and delta results represent less data transmission over the dynamic network because each distributed node 110 is collaborating with other peer nodes to perform the work locally utilizing available computational resources. Thus, the connection manager 132 can eliminate processing of relatively large result sets at a central node, e.g., the designated node 108. The connection manager 132 also provides a benefit in that each distributed node 110 in the network can receive a synchronized, up to date, delta to use or apply.

Thus, for component queries that are not satisfied by the central cache 116, the global agent 118 can make requests to the distributed nodes 110 to generate a global delta 122 of the data sources 126. Additionally, the global agent 118 can combine a non-updated, existing version of the central cache 116 to provide a complete and up-to-date answer, e.g., result 114, to the original query 112. Thus, the result 114 includes results from the version of the central cache 116 that existed prior to the execution of query 112 and any action partaken by the system 100 as a result of query 112.

Figure 2:
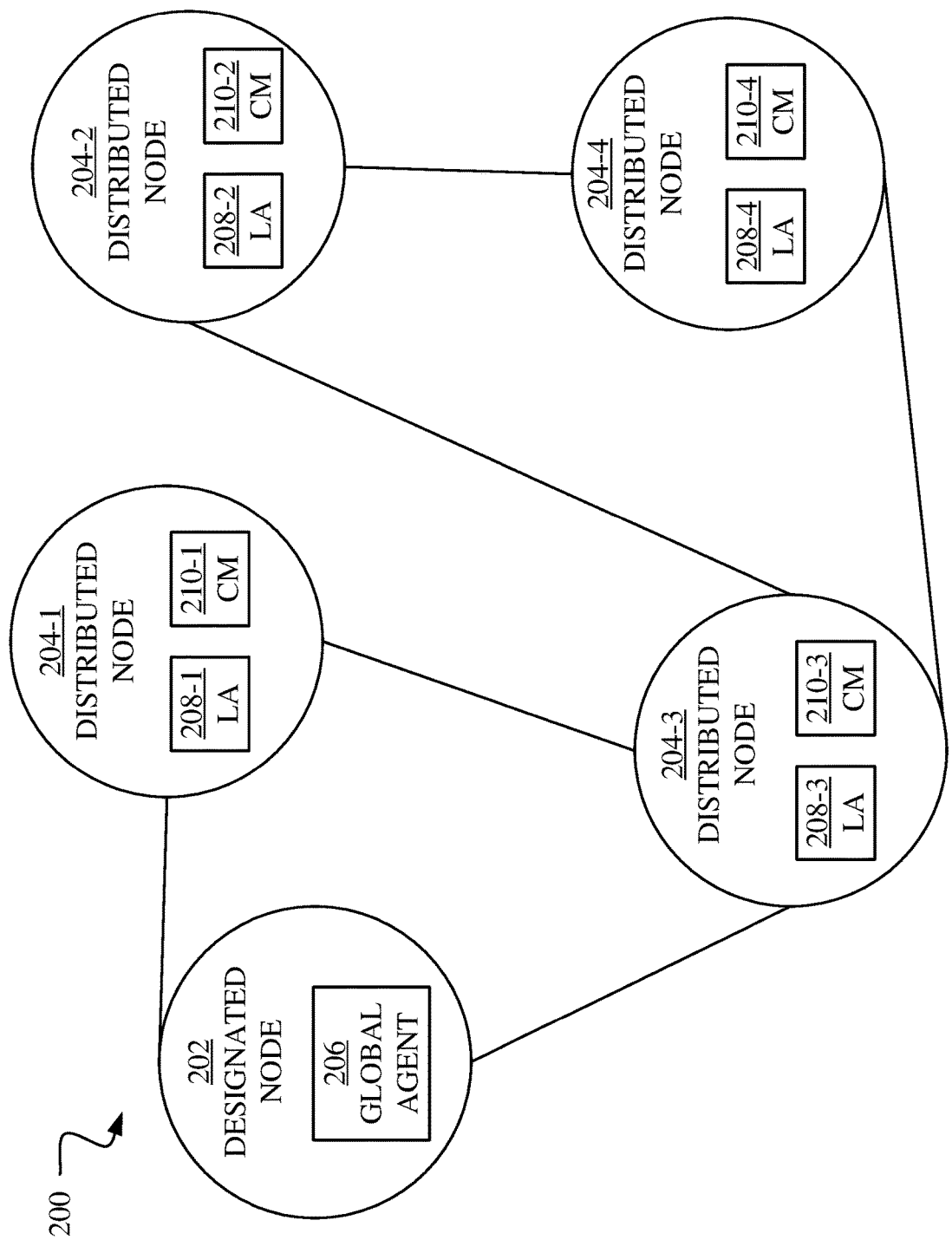
FIG. 2 is a block diagram of an example distributed database that generates global deltas, in accordance with some embodiments of the present disclosure.

FIG. 2 is a block diagram of an example distributed database 200 having global deltas, in accordance with some embodiments of the present disclosure. The distributed database 200 can be similar to the distributed database 106 described with respect to FIG. 1. The distributed database 200 can include a group of nodes connected in various topologies. For example, the topology can be fully connected, hierarchical, cyclic, linear, ring and/or a non-uniform partially connected graph. Further, the distributed database 200 can include nodes in combinations of topologies, such as, a hierarchical topology, with each leaf of the hierarchical portion being a non-uniform partially connected graph. In the example distributed database 200, a limited number of nodes are illustrated. However, in some embodiments of the present disclosure, the distributed database 200 may include more or fewer nodes than shown.

In the example distributed database 200, the nodes include a designated node 202 and distributed nodes 204-1 through 204-4 (also referred to herein, collectively, as distributed nodes 204). Similarly, the designated node 202 and distributed nodes 204 are collectively referred to herein as nodes 202, 204. The designated node 202 and distributed nodes 204 can be similar to the designated node 108 and distributed nodes 110. Further, designated nodes 202 and distributed nodes 204 may be capable of establishing connections with one another in a dynamic manner. Selected ones of the nodes 202, 204 are capable of disconnecting from certain ones of nodes 202, 204 and reconnecting to such nodes or other nodes on the same network. Other ones of nodes 202, 204 are capable of disconnecting from certain ones of nodes 202, 204 and reconnecting to such nodes or other nodes through a different network. Still other ones of nodes 202, 204 are capable of maintaining relatively stable connections. Further, nodes 202, 204 may be geographically distributed over large distances.

The distributed database 200 can thus represent a dynamic network of distributed nodes 202, 204 having access to a variety of data sources, e.g., data sources 126. Additionally, the distributed database 200 can provide the capability to execute user queries, e.g., query 112, and read data from one or more of the data sources 126 available. Further, the designated node 202 can include a global agent 206 which can be similar to the global agent 118. Similarly, the distributed nodes 204-1 through 204-4 can respectively include local agents (LA) 208-1 through 208-4 (collectively referred to herein as local agents 208) and connection managers (CM) 210-1 through 210-4 (collectively referred to herein as connection managers 210). The local agents 208 and connection managers 210 can be respectively similar to the local agent 124 and connection manager 132.

According to some embodiments of the present disclosure, the global agent 206, local agents 208, and connection managers 210 can reduce the data transfer across the network, e.g., network 102, during operations of the query 112. More specifically, the global agent 206, local agents 208, and connection managers 210 reduce data transfer by generating a delta between the data sources 124 in a prior state and the state at the time of query execution, e.g., global delta 122. The global delta 122 can be represented as sets of newly added relations, removed relations, and/or changes to existing relations within the data sources 126. The changed relations can be represented as additions, deletions, and field/column changes (when suitable keys are available that identify the row and column changed).

Figure 3:
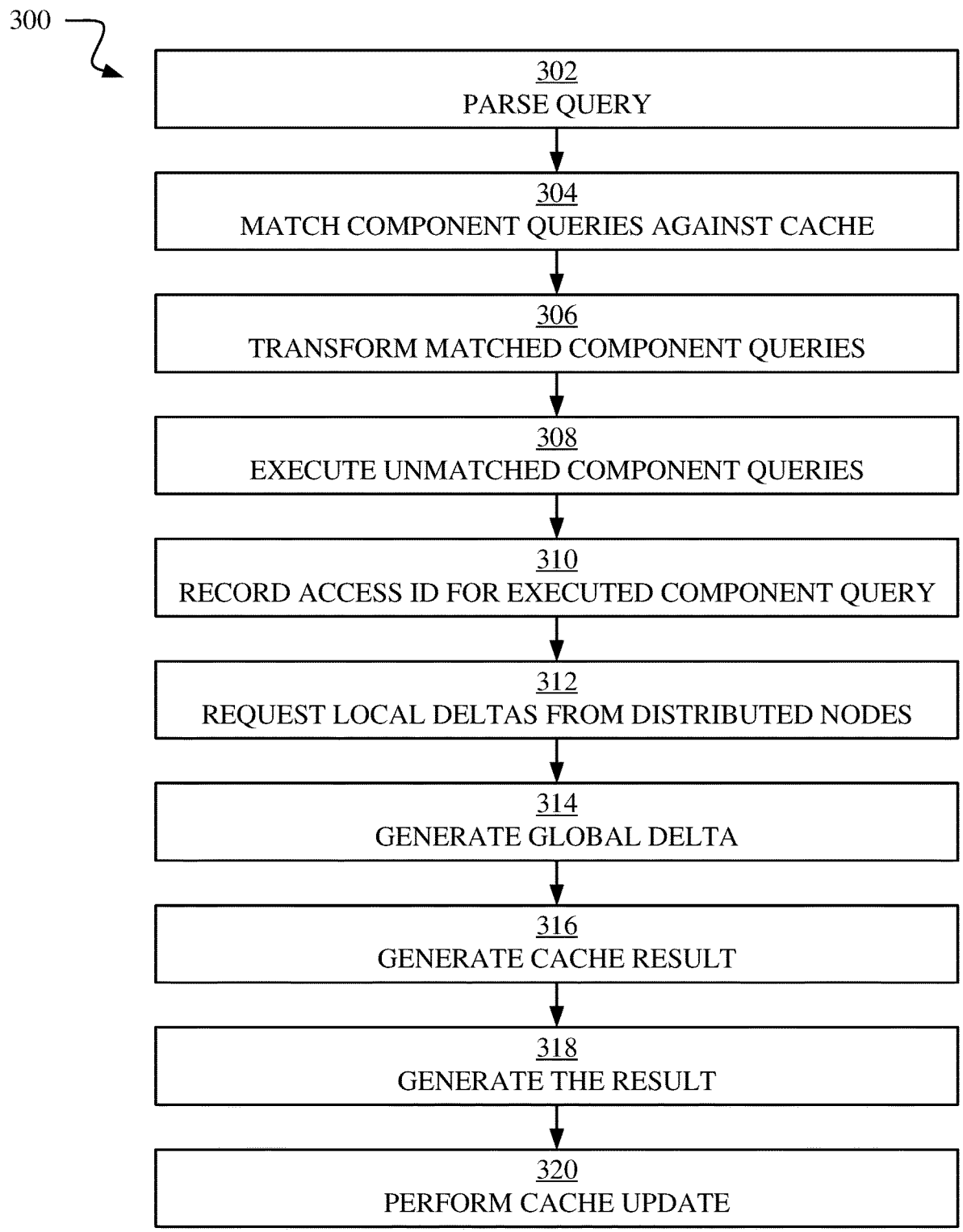
FIG. 3 is a process flow diagram of an example method for querying a distributed database using global deltas, in accordance with some embodiments of the present disclosure.

FIG. 3 is a process flow diagram of an example method 300 for querying the distributed database 106 using the global delta 122, in accordance with some embodiments of the present disclosure. A global agent and local agents, such as global agent 118, and local agents 124 can perform the method 300.

At operation 302, the global agent 118 can parse a query, such as, the query 112, into component queries. The global agent 118 can use the query engine of a database on the designated node 108 to parse the query 112. The component queries can be capable of being run on one or more remote data sources 126 on the distributed nodes 110. Additionally, the global agent 118 can transform the component queries to enable the use of both locally cached and remote operations.

At operation 304, the global agent 118 can match the component queries against a central cache (cache), such as the central cache 116. In other words, the global agent 118 can match the component queries, which may be simple data access, subqueries containing pushdown operations, and the like, against existing queries for which data may cached in the central cache 116. Multiple factors may be relevant to this matching operation including, but not limited to, the age of the data in the central cache 116, additional data relations accessed that are not in the central cache 116, the load on the target data source, the network characteristics between the designated node 108 and the distributed node 110 connecting to the data source 126, operations that the remote data source is capable of performing, and so on.

At operation 306, the global agent 118 can transform the matched component queries. Transforming the matched component queries can result in the generation of multiple component queries, e.g., one component query to execute locally against the central cache 116 on the designated node 108, and one or more component queries to be executed remotely against the data sources 126 on the distributed nodes 110. Furthermore, the global agent 118 can transform certain operations to enable the remote result (the result from the data source 124 on the distributed node 110) to be combined correctly with the cache result 120. For example, the global agent 118 can transform aggregation operations to use PARTIAL-INTERMEDIATE-FINAL techniques, convert subqueries to simpler forms of joins, and the like.

At operation 308, the local agents 124 can execute the unmatched component queries against their local data sources 126. Thus, a local agent 124 can execute each component query that cannot be satisfied by the central cache 116, against a local data source 126 of the relevant distributed node 110.

At operation 310, the local agent 124 can record the access id 128 for the executed component query. As stated previously, the access id 128 can include identifying information, such as, log sequence numbers, commit identifiers, timestamps, and/or any other information useful for identifying when the component query is run, and the specific data accessed, for relevant objects accessed from the data source 126 for the given component query.

At operation 312, the global agent 118 can request local deltas 130 from the distributed nodes. For component queries that are partially satisfiable by the central cache 116, the global agent 118 can generate a remote query for a distributed node 110. The remote query can request the local delta 130 from the point of the identifying information of the last cache update, i.e., a most recent cache update. The network of the distributed database 106 can provide the remote query to the distributed node 110 having a relevant data source 126 to determine the local delta 130. In this way, embodiments of the present disclosure can provide queries configured to access rows that have been updated since the last update to the central cache 116. Generating the local deltas 130 is described in greater detail with respect to FIG. 5.

At operation 314, the global agent 118 can generate the global delta 122. The local agents 124 of the distributed nodes 110 receiving the remote queries can provide the local deltas 130 for the designated node 108. Accordingly, the global agent 118 can combine the local deltas 130 into the global delta 122. Thus, the global delta 122 contains a set of result rows that have been added, deleted, or changed in the data sources 126 since the last update to the central cache 116. Generating the global delta is described in greater detail with respect to FIG. 4.

At operation 316, the global agent 118 can generate the cache result 120. The global agent 118 can execute component queries that can be satisfied by the central cache 116 to generate the cache result 120.

At operation 318, the global agent 118 can generate the result 114. The global agent 118 can apply the global delta to the cache result 120, and combine with the results of the unmatched component queries, to generate the result 114. The result 114 thus contains the relevant results from the central cache 116 and changes in the data sources 126 since the last update to the central cache 116 that are relevant to the query 112. Additionally, the global agent 118 can perform operations on the combined result of the central cache 116 and the global delta 122, such as, sorting, ranking, additional expression evaluation, additional joins to remote tables that were not present in the central cache 116, for example.

At operation 320, the global agent 118 can perform a cache update. In other words, the global agent 118 can update the central cache 116. In some embodiments of the present disclosure, an asynchronous cache update is one potential post-query action that the global agent 118 can perform. For example, the global agent 118 can use the received global delta 122 to update the central cache 116 after returning the query result 114 to the clients 104.

As described in the method 300, the global agent 118 can thus satisfy the query 112 using a combination of the currently cached data and retrieving the set of changes to cache without requiring a synchronous cache update. According to some embodiments of the present disclosure, the global agent 118 can thus reduce the amount of data transmission over the network 102 for the distributed database 106 compared to current systems. This advantage may depend upon several factors, including but not limited to, sufficient reduction of remote data access and transmission, size of the data cache, the volume of local deltas 130, and the overhead that delta computation may incur.

Figure 4:
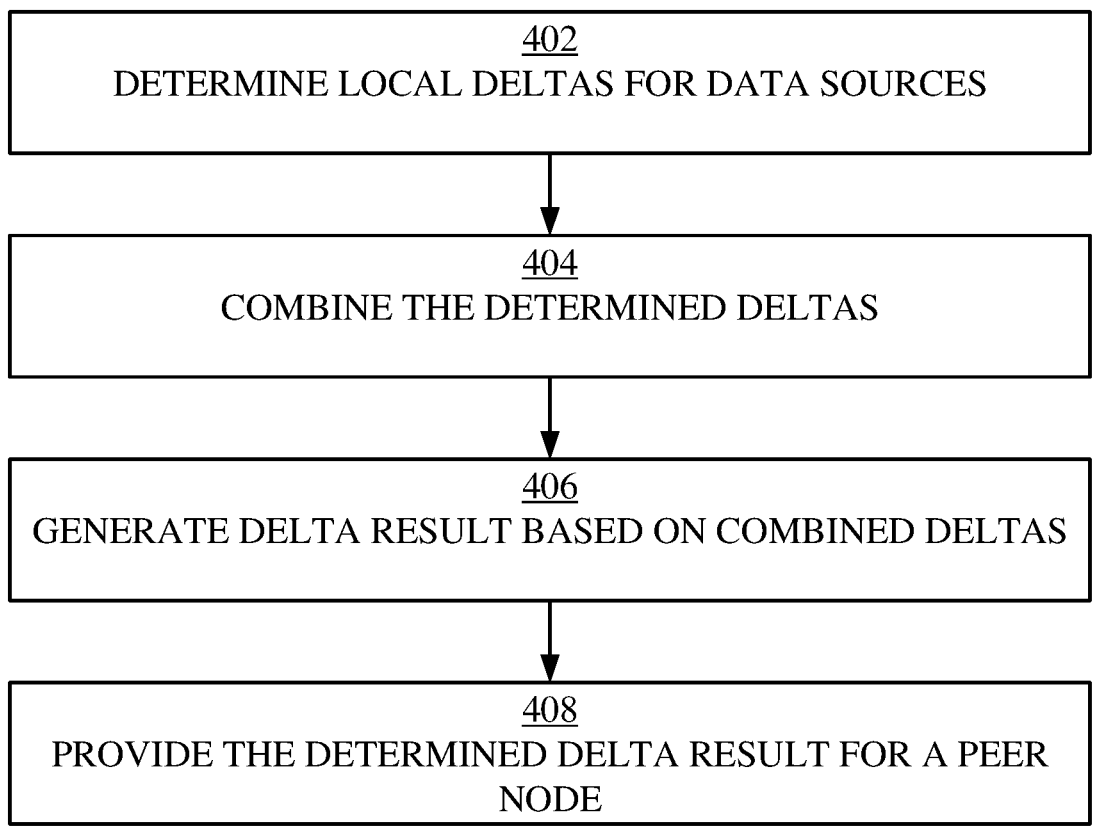
FIG. 4 is a process flow diagram of an example method for generating a global delta, in accordance with some embodiments of the present disclosure.

FIG. 4 is a process flow diagram of an example method 400 for generating the global delta 122, in accordance with some embodiments of the present disclosure. A connection manager, such as connection manager 132, can perform the method 400.

At operation 402, the connection manager 132 can determine a local delta 130 for a data source 126. In some cases, the connection manager 132 can receive local deltas 130 from one or more distributed nodes 110. Additionally, the connection manager 132 can use the local agent 124 to compute the local delta 130 for the local data source 126.

At operation 404, the connection manager 132 can combine the determined deltas. More specifically, the connection manager 132 can combine the received and/or computed local delta 130 with local deltas received from other peer nodes, e.g., distributed nodes 110, in the dynamic network, e.g., the distributed database 106.

At operation 406, the connection manager 132 can generate a delta result using the combined deltas. More specifically, the connection manager 132 can perform additional processing on the combined deltas. For example, the connection manager can perform SQL operations such as, SORT, JOIN, and the like. Further, the connection manager 132 can provide the processed delta results to another distributed node 110.

At operation 408, the connection manager 132 can provide the determined delta result for another peer node. The determined delta result can be the delta result generated at operation 406. However, in some scenarios, the determined delta result can be a received local delta and/or a combination of received local deltas.

Figure 5:
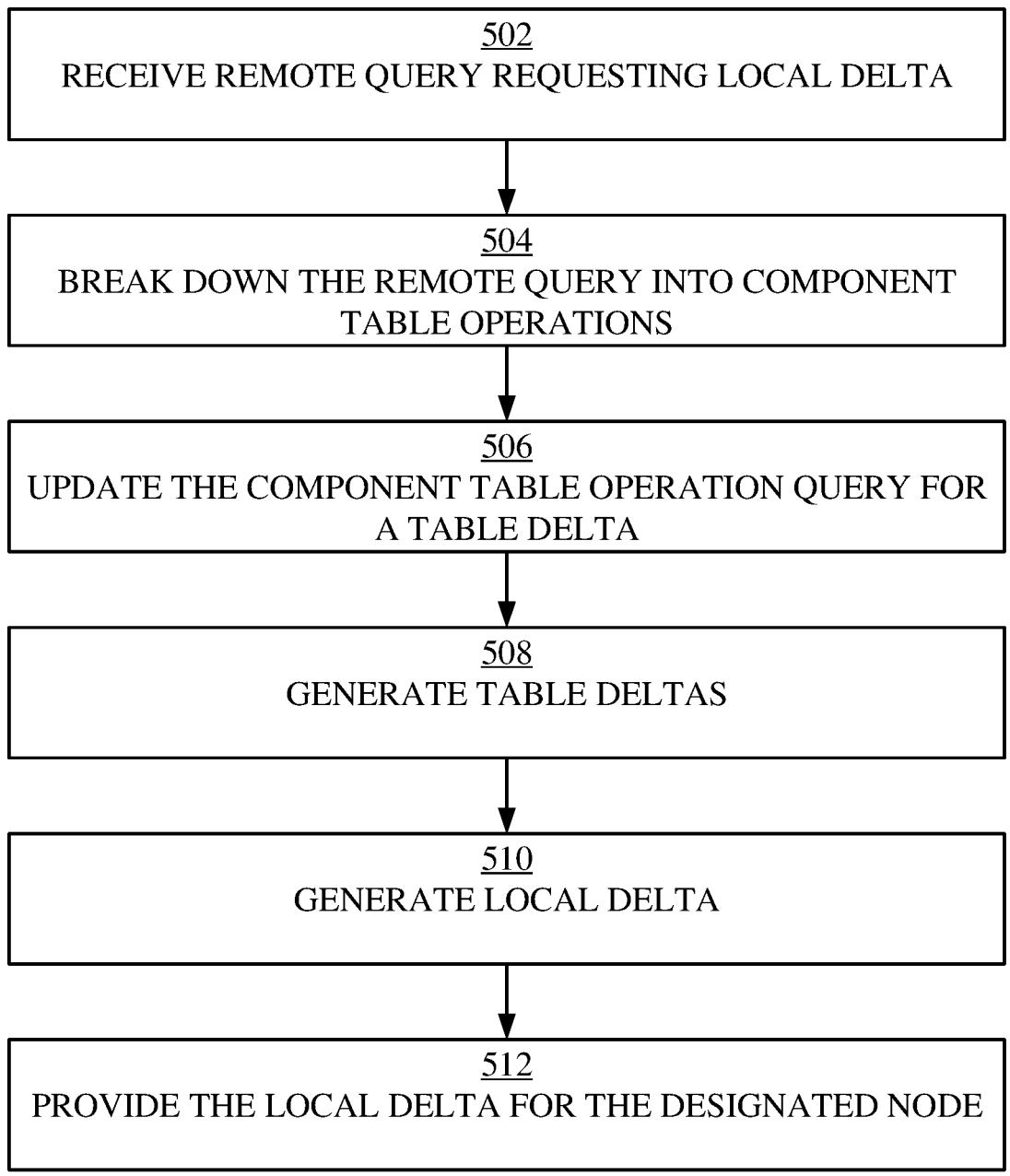
FIG. 5 is a process flow diagram of an example method for generating a local delta, in accordance with some embodiments of the present disclosure.

FIG. 5 is a process flow diagram of an example method 500 for generating the local delta 130, in accordance with some embodiments of the present disclosure. A local agent, such as local agent 124, can perform the method 500.

At operation 502, the local agent 124 can receive a remote query requesting the local delta 130. The remote query can be a component query that can be partially satisfied by the central cache 116 and partially satisfied by the local data source 126.

At operation 504, the local agent 124 can break down the remote query into component table operations. Breaking the remote query into component table operations can involve generating multiple queries (one for each table referenced in the remote query) that, in combination, can be functionally equivalent to the remote query.

While an unmatched component query may be executed as a unit, in some scenarios, the local agent 124 can break down an unmatched component query. For example, if the local data source 126 does not support a particular type of join, the local agent 124 can break down the unmatched component query into the component table accesses with the join occurring in the local agent 124.

At operation 506, the local agent 124 can update the component table operation query for a table delta. The local agent 124 can update the component table operation query to limit results to table changes occurring since the last access to the relevant table. As stated previously, the last access for each table can be described in the access ID 128.

At operation 508, the local agent 124 can generate local deltas for the tables (table deltas). Generating the table deltas can involve executing the updated component table operation queries. In this way, the local agent 124 can build a local delta for each table referenced in the component table operations.

At operation 510, the local agent can generate the local delta 130. Generating the local delta 130 can involve combining the table deltas. Generating the local delta 130 may thus entail accessing further portions of data relations beyond the actual delta or filtering the delta. For example, the contents of the local delta 130 may be filtered by data predicates contained within the remote query. Alternatively, in the case of a JOIN between two database table relations, the addition of a new row in the first relation may implicate accessing additional portions of the second relation to ensure the join result contains a row corresponding to the newly added rows. Additionally, in the case of aggregation, the local agent 124 can build a PARTIAL-INTERMEDIATE aggregate result as part of local delta 130, which would be combinable with the PARTIAL-INTERMEDIATE aggregation result in the cache result 120 to produce the FINAL aggregation result, e.g., result 114. Accordingly, the local agents 124 can perform many general query operations on the delta of individual relations to compute the local delta 130 for the query result on a given distributed node 110.

At operation 512, the local agent 124 can provide the local delta 130 for the designated node 108. Each distributed node 110 having computed the local delta 130 for the remote query can thus return the local delta 130 to parent nodes in the distributed database 106. Such parent nodes receiving local deltas from a child can combine multiple local deltas 130 from multiple child nodes or propagate the local deltas 130 unchanged to parent nodes until the designated node 108 receives the local deltas 130.

Figure 6:
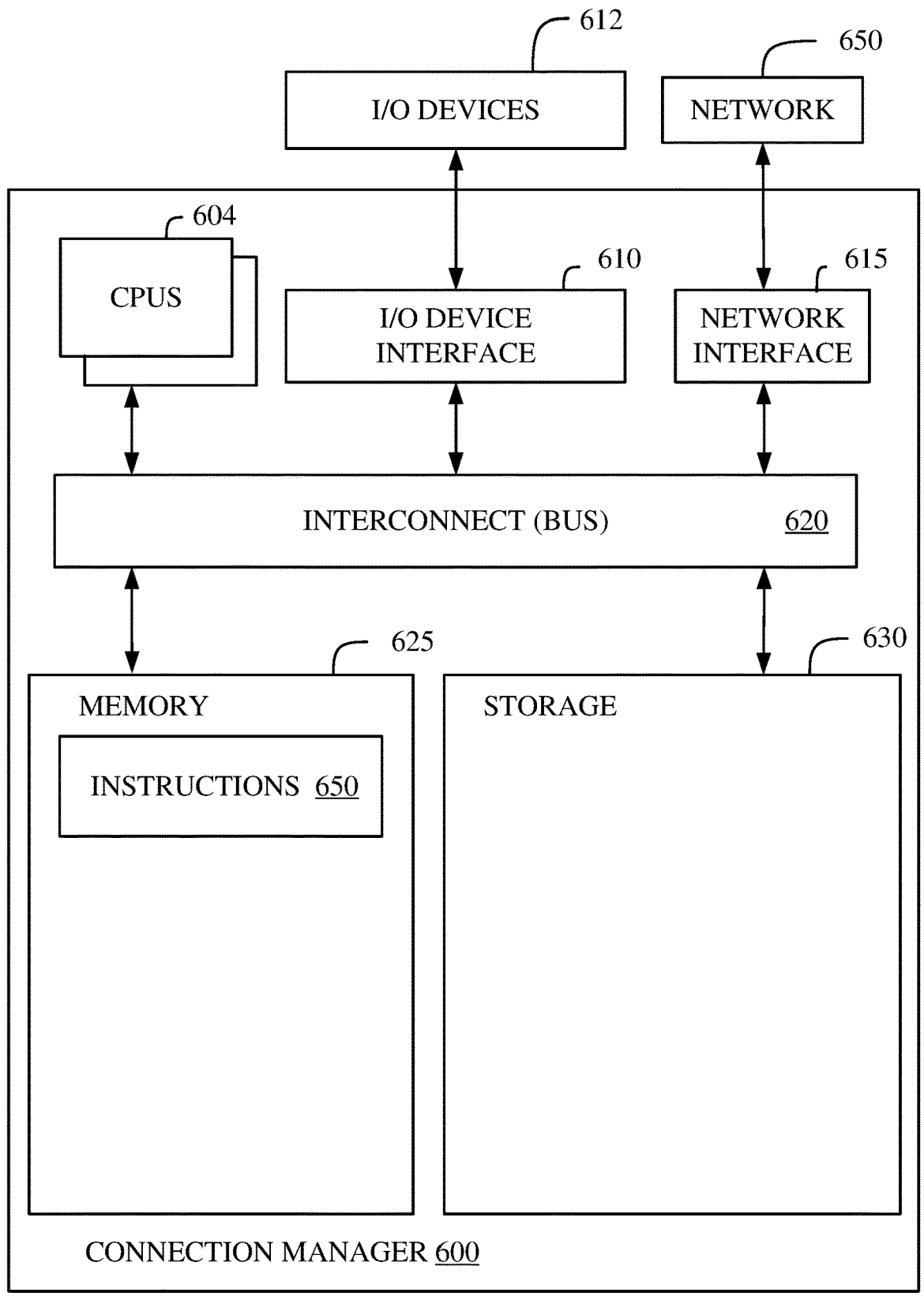
FIG. 6 is a block diagram of an example connection manager, in accordance with some embodiments of the present disclosure.

FIG. 6 is a block diagram of an example connection manager 600, in accordance with some embodiments of the present disclosure. In various embodiments, the connection manager 600 is similar to the global agent 118 and local agent 124, and can perform the methods described in FIGS. 3-5 and/or the functionality discussed in FIGS. 1 and 2. In some embodiments, the connection manager 600 provides instructions for the aforementioned methods and/or functionalities to a client machine such that the client machine executes the method, or a portion of the method, based on the instructions provided by the connection manager 600. In some embodiments, the connection manager 600 comprises software executing on hardware incorporated into a plurality of devices.

The connection manager 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the connection manager 600 via the I/O device interface 610 or to a network 650 via the network interface 615.

In some embodiments, the memory 625 stores instructions 660. However, in various embodiments, the instructions 660 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all, any of the methods described in FIGS. 3-5 and/or the functionality discussed in FIGS. 1 and 2.

In various embodiments, the I/O devices 612 include an interface capable of presenting information and receiving input. For example, I/O devices 612 can present information to a listener interacting with connection manager 600 and receive input from the listener. The connection manager 600 is connected to the network 650 via the network interface 615. Network 650 can comprise a physical, wireless, cellular, or different network.

In some embodiments, the connection manager 600 can be a multi-user mainframe computer system, a single-user system, or a server computer or similar device that has little or no direct user interface but receives requests from other computer systems (clients). Further, in some embodiments, the connection manager 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary connection manager 600. In some embodiments, however, individual components can have greater or lesser complexity than as represented in FIG. 6, components other than or in addition to those shown in FIG. 6 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
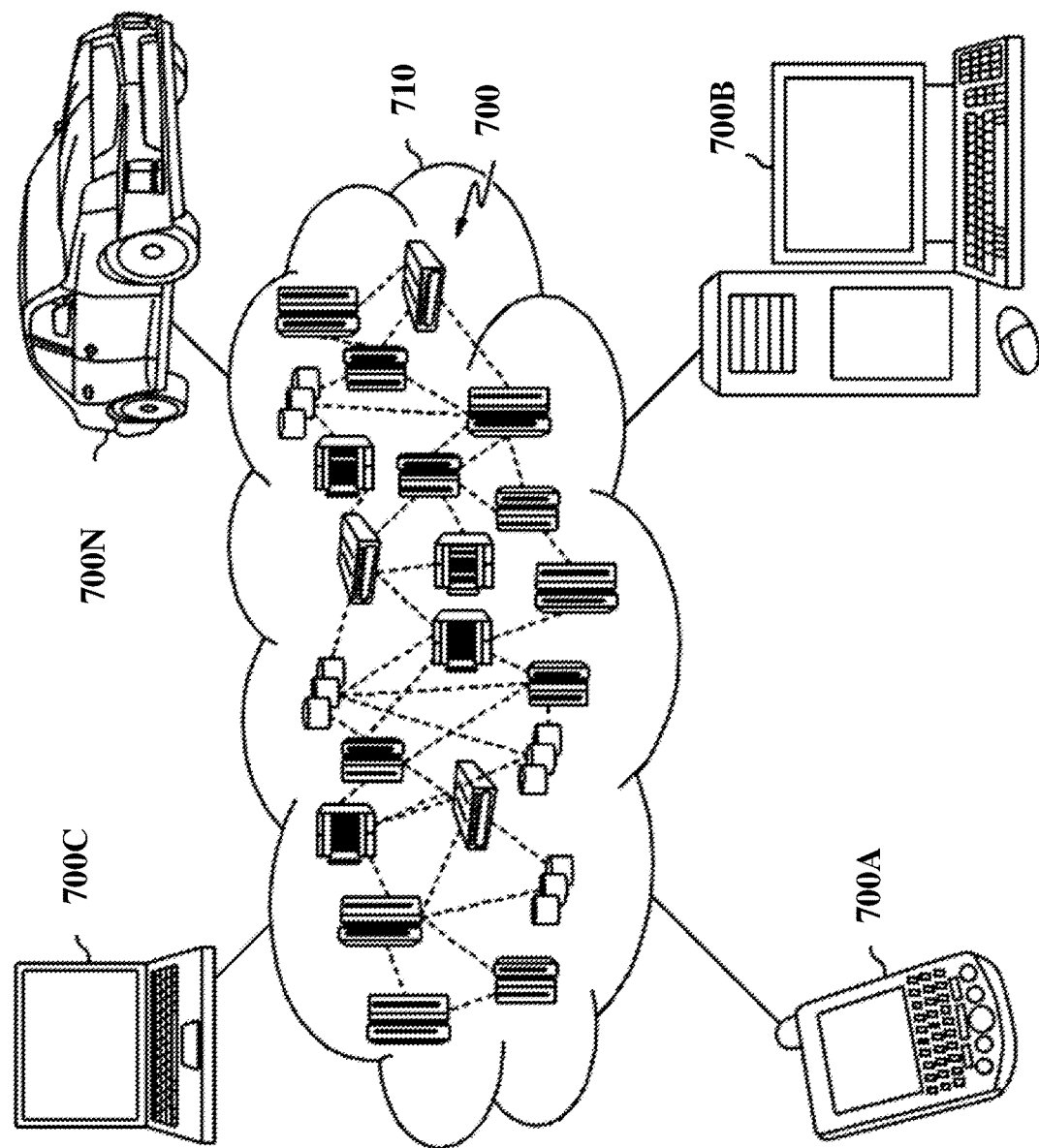
FIG. 7 is a cloud computing environment, in accordance with some embodiments of the present disclosure.

FIG. 7 is a cloud computing environment 710, according to some embodiments of the present disclosure. As shown, cloud computing environment 710 includes one or more cloud computing nodes 700. The cloud computing nodes 700 can perform the method described in FIGS. 3-5 and/or the functionality discussed in FIGS. 1 and 2. Additionally, cloud computing nodes 700 can communicate with local computing devices used by cloud consumers, such as, for example, personal digital assistant (PDA) or cellular telephone 700A, desktop computer 700B, laptop computer 700C, and/or automobile computer system 700N. Further, the cloud computing nodes 700 can communicate with one another. The cloud computing nodes 700 can also be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
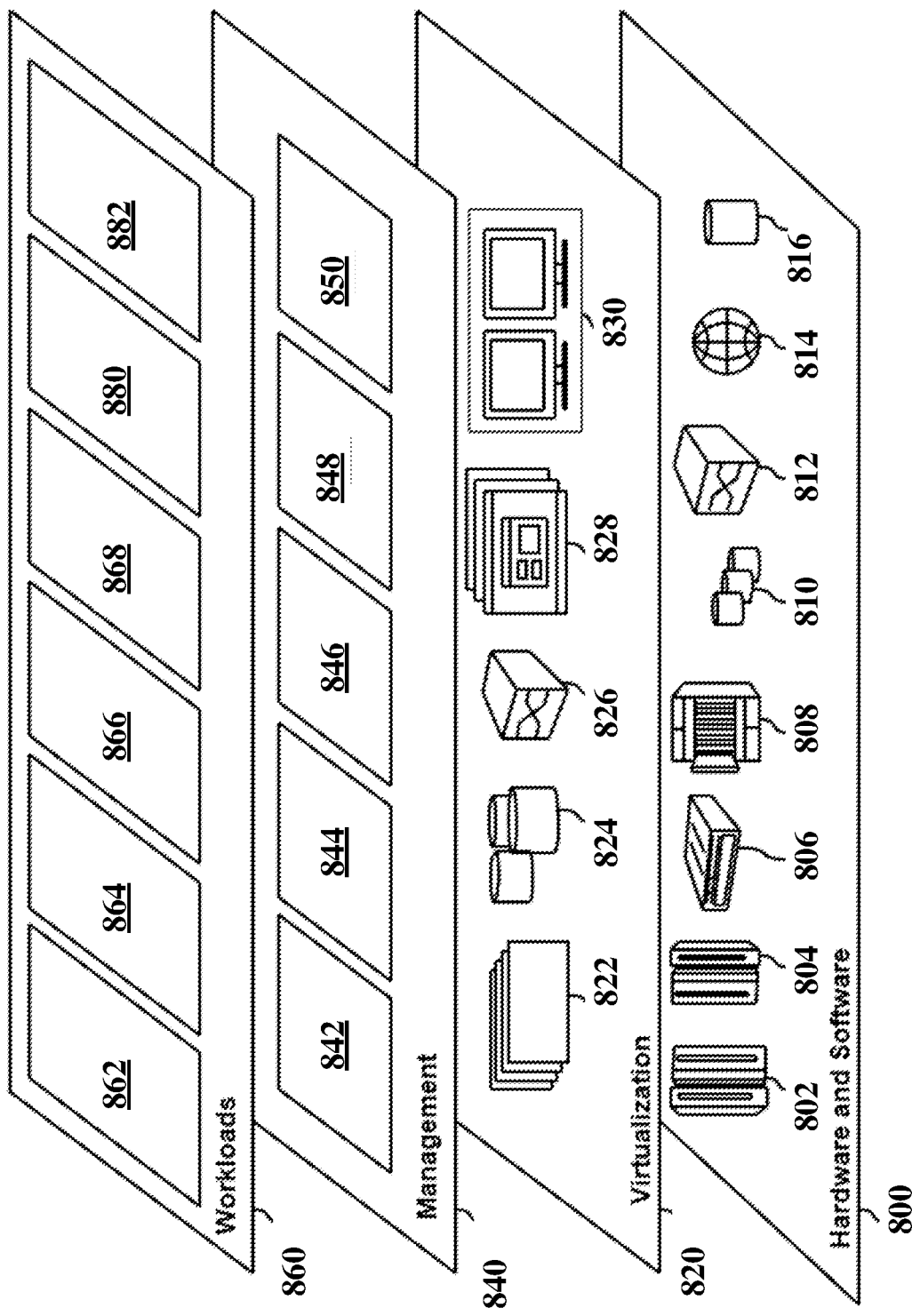
FIG. 8 is a set of functional abstraction model layers provided by the cloud computing environment, in accordance with some embodiments of the present disclosure.

FIG. 8 is a set of functional abstraction model layers provided by cloud computing environment 710 (FIG. 7), according to some embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service level management 848 can allocate suitable processing power and memory to process static sensor data. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and connection manager 872.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   receiving a plurality of local deltas for an execution of a query against a corresponding plurality of data sources hosted by a corresponding plurality of distributed nodes of a dynamic distributed network;
   generating a combined delta by combining the local deltas;
   generating a determined delta result by performing additional processing on the combined delta, wherein the combined delta comprises a global set of changes that have occurred to the plurality of data sources between a first state and a second state, and wherein the additional processing comprises:
      generating a cache result by executing a matched component query against a central cache, wherein the matched component query matches the central cache;
      applying the combined delta to the cache result;
      generating an unmatched component result by executing an unmatched component query of the query against one of the plurality of data sources, wherein the unmatched component query does not match the central cache;
      generating the determined delta result by combining the unmatched component result with the cache result; and
   providing the determined delta result for one of the distributed nodes in response to the query.

2. The method of claim 1, further comprising determining a source local delta for a local data source of the plurality of data sources, wherein generating the combined delta comprises combining the source local delta and the local deltas.

3. The method of claim 2, wherein determining the source local delta comprises:
   determining a prior state of one or more tables of the local data source;
   determining a current state of the one or more tables; and
   determining one or more differences between the prior state and the current state, wherein the source local delta indicates the one or more differences.

4. The method of claim 2, wherein the source local delta is associated with a remote distributed node that is remote to a local distributed node that is determining the source local delta.

5. The method of claim 2, wherein determining the source local delta comprises performing a log analysis.

6. The method of claim 2, wherein determining the source local delta comprises using a history table hosted by the local data source.

7. The method of claim 1, further comprising accessing a plurality of additional tables in a local data source of the plurality of data sources, wherein generating the determined delta result comprises combining the additional tables with the combined delta or applying data transformation upon the combined delta.

8. The method of claim 1, further comprising accessing a plurality of local deltas for a corresponding plurality of additional tables in a local data source of the plurality of data sources, wherein generating the determined delta result comprises combining the local deltas for the corresponding plurality of additional tables with the combined delta or applying data transformation upon the combined delta.

9. A computer program product comprising one or more computer readable storage media, and program instructions collectively stored on the one or more computer readable storage media, the program instructions comprising instructions configured to cause one or more processors to perform a method comprising:

receiving a plurality of local deltas for an execution of a query against a corresponding plurality of data sources hosted by a corresponding plurality of distributed nodes of a dynamic distributed network;

generating a combined delta by combining the local deltas;

generating a determined delta result by performing additional processing on the combined delta, wherein the combined delta comprises a global set of changes that have occurred to the plurality of data sources between a first state and a second state, and wherein the additional processing comprises:

generating a cache result by executing a matched component query against a central cache, wherein the matched component query matches the central cache;

applying the combined delta to the cache result;

generating an unmatched component result by executing an unmatched component query of the query against one of the plurality of data sources, wherein the unmatched component query does not match the central cache; and generating the determined delta result by combining the unmatched component result with the cache result; and providing the determined delta result for one of the distributed nodes in response to the query.

10. The computer program product of claim 9, wherein the method further comprises determining a source local delta for a local data source of the plurality of data sources, and wherein generating the combined delta comprises combining the source local delta and the local deltas, wherein determining the source local delta comprises:

determining a prior state of one or more tables of the local data source of the plurality of data sources;

determining a current state of the one or more tables; and determining one or more differences between the prior state and the current state, wherein the source local delta indicates the one or more differences.

11. The computer program product of claim 10, wherein the source local delta is associated with a remote distributed node that is remote to a local distributed node that is determining the source local delta.

12. The computer program product of claim 10, wherein determining the source local delta comprises performing a log analysis.

13. The computer program product of claim 10, wherein determining the source local delta comprises using a history table hosted by the local data source of the plurality of data sources.

14. The computer program product of claim 9, further comprising accessing a plurality of additional tables in a local data source of the plurality of data sources, wherein generating the determined delta result comprises combining the additional tables with the combined delta or applying data transformation upon the combined delta.

15. The computer program product of claim 9, further comprising accessing a plurality of local deltas for a corresponding plurality of additional tables in a local data source of the plurality of data sources, wherein generating the determined delta result comprises combining the local deltas for the corresponding plurality of additional tables with the combined delta or applying data transformation upon the combined delta.

16. A system comprising:

one or more computer processing circuits; and one or more computer-readable storage media storing program instructions which, when executed by the one or more computer processing circuits, are configured to cause the one or more computer processing circuits to perform a method comprising:

receiving a plurality of local deltas for an execution of a query against a corresponding plurality of data sources hosted by a corresponding plurality of distributed nodes of a dynamic distributed network;

generating a combined delta by combining the local deltas;

generating a determined delta result by performing additional processing on the combined delta, wherein the combined delta comprises a global set of changes that have occurred to the plurality of data sources between a first state and a second state, and wherein the additional processing comprises:

generating a cache result by executing a matched component query against a central cache, wherein the matched component query matches the central cache;

applying the combined delta to the cache result;

generating an unmatched component result by executing an unmatched component query of the query against one of the plurality of data sources, wherein the unmatched component query does not match the central cache;

generating the determined delta result by combining the unmatched component result with the cache result; and providing the determined delta result for one of the distributed nodes in response to the query.

17. The system of claim 16, the method further comprising:

determining a source local delta for a local data source of the plurality of data sources, and wherein generating the combined delta comprises combining the source local delta and the local deltas, wherein determining the source local delta comprises:

determining a prior state of one or more tables of the local data source;

determining a current state of the one or more tables; and determining one or more differences between the prior state and the current state, wherein the source local delta indicates the one or more differences, wherein the source local delta is associated with a remote distributed node that is remote to a local distributed node that is determining the source local delta.

18. The system of claim 17, wherein determining the source local delta comprises performing a log analysis.

19. The system of claim 17, wherein determining the source local delta comprises using a history table hosted by the local data source of the plurality of data sources.

20. The system of claim 16, further comprising accessing a plurality of additional tables in a local data source of the plurality of data sources, wherein generating the determined delta result comprises combining the additional tables with the combined delta or applying data transformation upon the combined delta.

\* \* \* \* \*